Dec. 13, 1960   J. J. F. DELFOS   2,964,428
METHOD OF PURIFYING SUGAR JUICES
Filed March 9, 1956
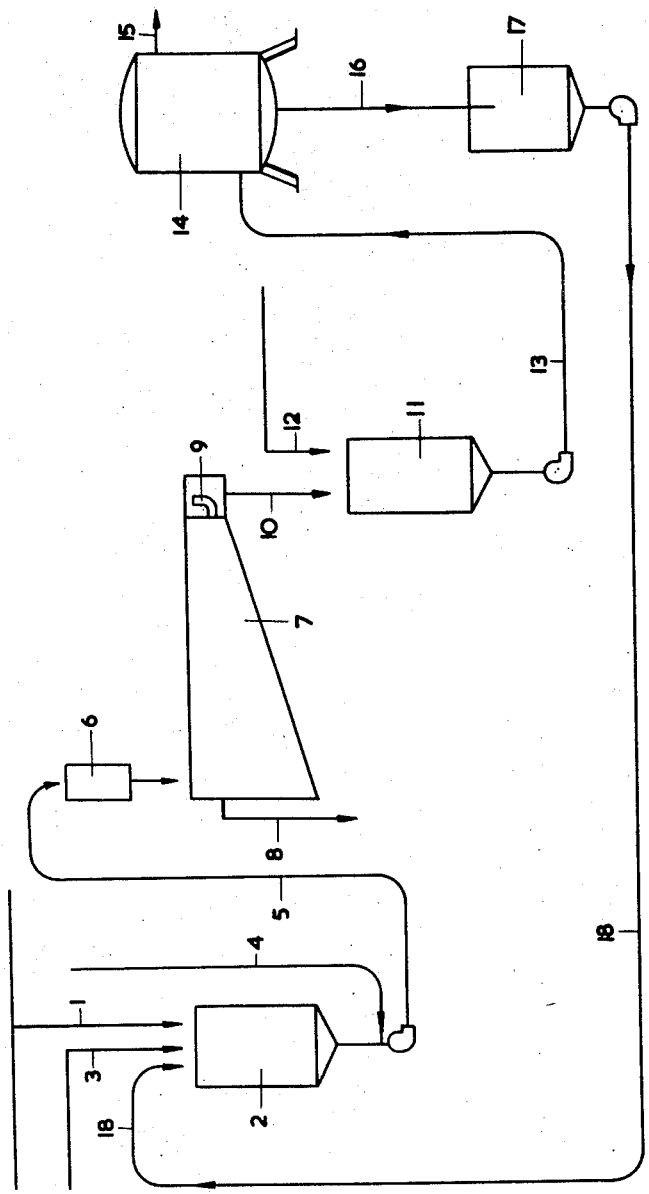
INVENTOR.
JOHANNES J. F. DELFOS
BY
Attys.

United States Patent Office 2,964,428
Patented Dec. 13, 1960

2,964,428

METHOD OF PURIFYING SUGAR JUICES

Johannes Jacobus Fredrik Delfos, Heemstede, Netherlands, assignor to N.V. Algemeene Norit Maatschappij, Amsterdam, Netherlands, a corporation of Netherlands Filed May 9, 1956, Ser. No. 570,449

Claims priority, application Netherlands Nov. 8, 1955

1 Claim. (Cl. 127—50)

It is known in the refining of sugar, more particularly cane sugar, to clarify the impure sugar solutions by adding thereto lime and phosphoric acid and by passing air though the liquid. The calcium phosphate precipitate formed will occlude all kinds of impurities of a colloidal nature and when air is passed through the solution air bubbles will adhere to the precipitate so that this will separate out in the form of a scum which may be easily removed by mechanical means.

Furthermore it is known to decolorize the clarified liquor with active carbon, more particularly with Norit. For this purpose the clarified liquor is stirred with such an amount of powdered carbon that the desired decolorization of the liquor is achieved and subsequently filtered, a filter aid, e.g. a diatomaceous earth, being mostly added.

The disadvantage of this method is that the filtered carbon which is in equilibrium with the decolorized solution, is by no means spent and would be still capable of adsorbing coloring matter from more strongly colored solutions. It has been proposed, therefore, and in some cases this proposal has already been carried out in actual practice, to effect the decolorization with active carbon in two steps by first treating the liquor to be decolorized with carbon already used and subsequently subjecting the filtered solution to a treatment with fresh carbon in a second step.

In this method the consumption of active carbon is lower; in order to reach a same degree of decolorization an amount of carbon is required which is less by 30% than when the same decolorization is attained in one step. This advantage, however, is offset by the disadvantage that a duplicate apparatus is required and that this treatment in two steps also requires a greater expenditure on labour. Generally speaking, therefore, the treatment in two steps has been discarded in the countries of the Western Hemisphere because the economization resulting from the lower proportion of active carbon required is outweighed by the higher costs resulting from the above mentioned causes.

The present invention relates to a method by which the advantage of using the active carbon twice may be attained, without this being offset by an appreciable increase of the apparatus and a greater expenditure on labour. This method consists in that the active carbon after having been once used for the decolorization is added to the liquor in which the calcium phosphate precipitate is formed, said carbon being removed together with the calcium phosphate scum.

Experiments have shown, that the carbon used once not only adsorbs an appreciable amount of coloring matter under these conditions, but that in addition the carbon is practically entirely absorbed in the calcium phosphate scum, so that the carbon need not be filtered off but may be removed together with the scum. The scum, in consequence, is of a black color, while the liquor obtained is practically clear. Tests have shown that this liquor still contains a very slight amount of carbon (3-5% of the amount added), but this is not objectionable, because after the subsequent treatment with fresh carbon the liquor has to be filtered.

The clarification after the formation of calcium phosphate in the presence of the active carbon is preferably effected in the heat, i.e. at the conventional temperature of about 96° C.

In order to introduce the cake of active carbon obtained in the filter into the liquor to be clarified, said cake may be diluted with water to a suspension which for example may contain 1 part by weight of carbon to 7 parts by weight of water and in the form of this suspension it may be passed into the vessel in which the phosphoric acid and the lime are added to the sugar solution.

If desired said suspension may be used as part of the water required for dissolving the sugar. Preferably the suspension of used active carbon is first added to the liquor, subsequently the phosphoric acid and finally the lime in the form of milk of lime, but it is also possible to change this sequence.

The effect of the method according to the invention applied to affinated Cuban raw sugar appears from the following table in which the color is indicated in degrees Horne and the decolorization in percentages of the original color. In said table the conventional method in which the sugar solution clarified with calcium phosphate is subjected to one after-treatment with Norit is compared with the method according to the invention in which the Norit used is recycled and added to the liquor to be clarified.

| Conventional method | | | New method | | |
|---|---|---|---|---|---|
| | color | decolorization | | color | decolorization |
| initial solution | 17.2 | | initial solution | 17.2 | |
| clarified with 9.025% P₂O₅+ lime. | 12.6 | 26.7 | clarified with 0.025% P₂O₅+ lime+0.45% once used Norit. | 9.7 | 43.6 |
| treated with 0.6% of fresh Norit. | 2 | 88.4 | treated with 0.45% fresh Norit. | 1.6 | 90.7 |

From the above table it appears that by the method according to the invention a more thorough decolorization is achieved, although the amount of Norit used is lower by 25%.

In addition a considerable economy in filter aid is possible in the latter case. In the normal treatment with Norit the amount of filter aid required for achieving a good filtering rate is generally about ½–⅓ of the weight of carbon. When applying the method according to the invention in the manner described above it appeared, however, that a much smaller addition of filter aid sufficed and that when using a carbon having good filtering properties said addition may often be entirely omitted.

The method according to the invention will be illustrated with reference to the accompanying flow sheet.

The sugar solution to be clarified flows through a line 1 into the vessel 2 into which also the required amounts of phosphoric acid and lime are fed at 3. We may e.g. first add the phosphoric acid and thereafter adjust the pH to the desired value by means of lime.

Through the line 4 air is blown or drawn into the liquor whereby an intensive mixing is effected, so that air will be incorporated into the precipitate formed. Via line 5 and the intermediate vessel 6 the mass is introduced into the clarifying tank 7 in which the air-bearing precipitate separates at the surface as a scum, which is continuously removed through the line 8. The clarified liquor flows via the overflow 9 through the line 10 to the vessel 11 into which through the line 12 fresh Norit is fed. After this fresh Norit has been homegeneously distributed through the liquor and has had an opportunity to take up the substances to be adsorbed, the mixture is conveyed via the line 13 to the filter 14. The filtered clarified liquor is removed through the line 15, the Norit used being removed via the line 16.

In the process according to the invention the Norit once used coming from the filter is collected in the buffering tank 17. From this tank it is recycled, preferably mixed with the amount of aqueous liquid or crude sugar solution, desired for obtaining a free flowing liquid, through the line 18 towards the vessel 2 in which the calcium phosphate precipitate is formed. The Norit here adsorbs a portion of the impurities contained in the liquor, more particularly coloring matter, and is incorporated into the calcium phosphate precipitate, so that it may be removed together with the calcium phosphate scum by the scum removing device 7.

The method according to the invention is generally also suitable for clarifying other sugar solutions to be treated with decolorizing carbon, which contain impurities in colloidal condition and come into consideration for a pre-treatment with calcium phosphate.

I claim:

In the method of purifying cane sugar solutions which comprises the clarification treatment of adding lime and phosphoric acid to said solutions, introducing air into the same, separating the calcium phosphate scum containing occluded air bubbles from the clarified solution, stirring said clarified solution with activated carbon to adsorb coloring matter and removing the activated carbon from the decolorized solution by filtration, the improvement which constitutes returning said activated carbon to the sugar solution to be subjected to the clarification treatment with lime and phosphoric acid, the so-returned activated carbon being occluded in the calcium phosphate scum and removed together therewith.

References Cited in the file of this patent

UNITED STATES PATENTS

| | | |
|---|---|---|
| 1,221,553 | McCaskell | Apr. 3, 1917 |
| 1,314,203 | Mumford | Aug. 26, 1919 |
| 2,216,754 | Sanchez | Oct. 8, 1940 |
| 2,763,580 | Zabor | Sept. 18, 1956 |

OTHER REFERENCES

Sugar Cane Handbook, by Guliford Spencer and Geo. Meade, 8th ed., 1945, John Wiley and Sons, Inc., N.Y., pp. 329, 330.

Bulletin No. 173 of La. State Univ., March 1920, by Zerban.

Industrial and Eng. Chem., col. 33, No. 9, September 1941, art. "Activated Carbon for Sugar Decolorization," by Hertzog v. Broderick, pp. 1192–1198.